United States Patent [19]

Persson et al.

[11] 4,404,052

[45] Sep. 13, 1983

[54] DYNAMIC LAMINATING METHOD AND APPARATUS FOR ULTRASONICALLY BONDING JUXTAPOSED WEBS

[75] Inventors: Louis T. Persson; Coenraad E. Riemersma, both of Cincinnati, Ohio

[73] Assignee: The Procter & Gamble Company, Cincinnati, Ohio

[21] Appl. No.: 342,700

[22] Filed: Jan. 26, 1982

[51] Int. Cl.³ .................. B29C 27/08; B32B 31/20
[52] U.S. Cl. ..................... 156/73.1; 156/164; 156/229; 156/290; 156/580.2; 264/23
[58] Field of Search .............. 156/73.1, 580.1, 580.2, 156/62.8, 164, 181, 290, 229; 264/23

[56] References Cited

U.S. PATENT DOCUMENTS

| | | | |
|---|---|---|---|
| 2,485,725 | 10/1949 | Francis, Jr. | 156/164 |
| 3,242,029 | 3/1966 | Deans | 156/580.2 |
| 3,562,041 | 2/1971 | Robertson | 156/73.1 |
| 3,733,238 | 5/1973 | Long et al. | 156/580.1 |
| 3,836,413 | 9/1974 | Frohlich et al. | 156/580.2 |
| 4,313,778 | 2/1982 | Mims | 156/580.1 |

Primary Examiner—Michael G. Wityshyn
Attorney, Agent, or Firm—Thomas J. Slone; Fredrick H. Braun; Richard C. Witte

[57] ABSTRACT

A method and apparatus for bonding together a plurality of juxtaposed webs which are subject to being ultrasonically bonded together to form a laminate as the webs are being driven forward at a relatively high velocity. The regions of the webs to be bonded are subjected to progressively increasing compressive forces while simultaneously being subjected to ultrasonic energy as they traverse an elongate portion of a predetermined path at a predetermined velocity. After the regions are ultrasonically bonded they may be subjected to another compression prior to the bonds becoming fully set upon cooling. The method may be practiced in an apparatus which includes an ultrasonic horn and an anvil which are configured and disposed to define a bonding passageway having an elongate convergent portion; and the apparatus may include a pressure roll biased towards the anvil adjacent the downstream end of the passageway. In a preferred apparatus embodiment: the anvil is a power-rotated cylinder having a relief-type bonding pattern disposed on its circumferential surface, and the face of the ultrasonic horn is so curved in the machine direction that the passageway has a convergent-divergent arcuate shape; the entrance to the passageway is sufficiently high to obviate web-splice induced jams; and the convergent portion of the passageway is preferably somewhat longer in the machine direction than the divergent portion.

6 Claims, 6 Drawing Figures

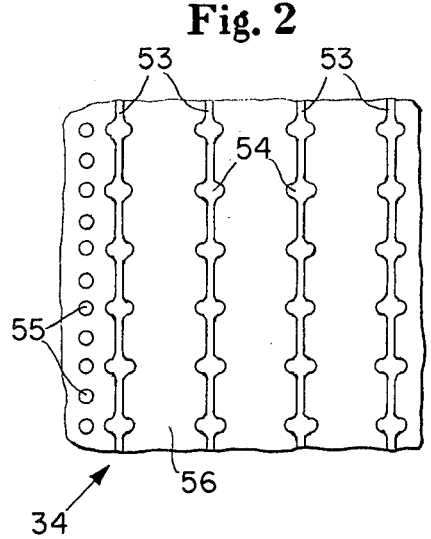
Fig. 2
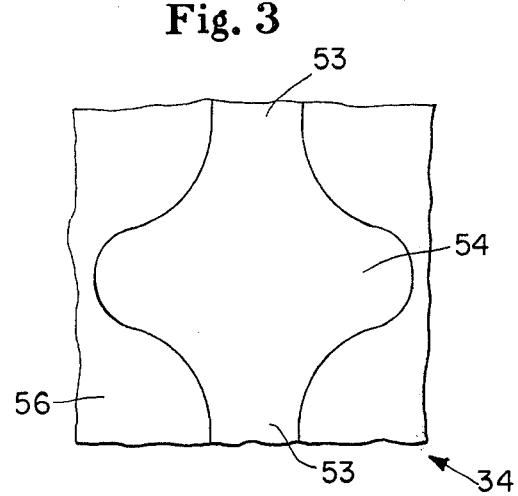
Fig. 3
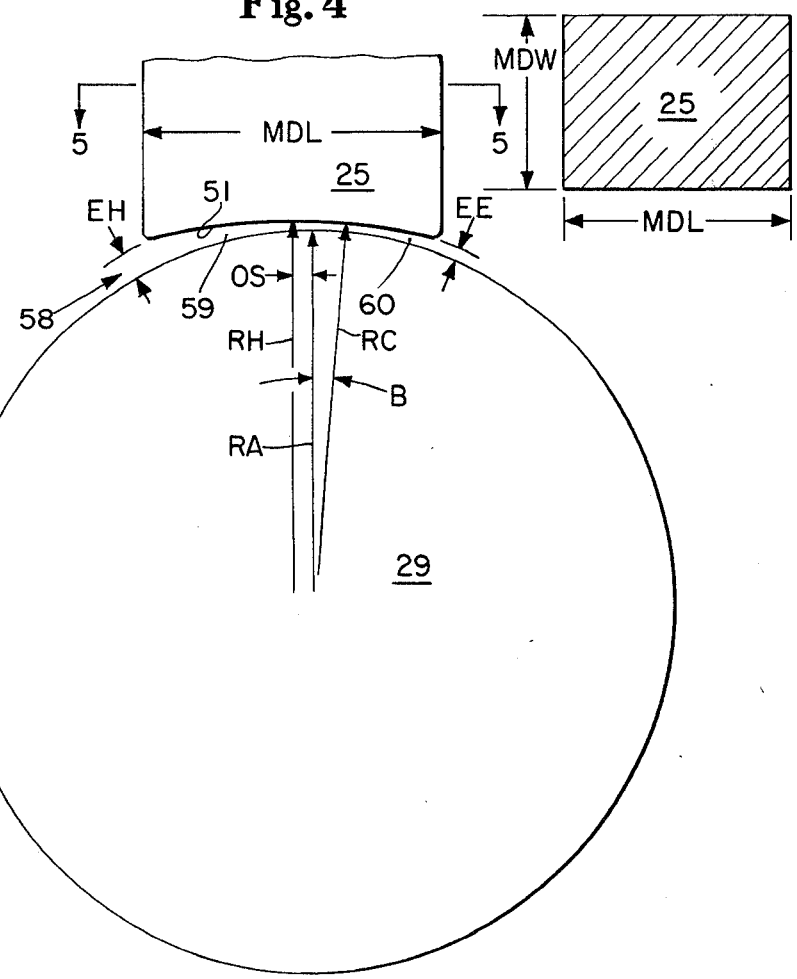
Fig. 4
Fig. 5

DYNAMIC LAMINATING METHOD AND APPARATUS FOR ULTRASONICALLY BONDING JUXTAPOSED WEBS

TECHNICAL FIELD

This invention pertains to ultrasonically bonding together webs—particularly thin flexible webs—to form a flexible laminate thereof which webs are, corporately, subject to being ultrasonically bonded together: preferably pattern bonded together. Such webs include, for example, fibrous non-wovens of such materials as polyesters, and polypropylene; thermoplastic films; and elastomeric films comprising such materials as butadiene/styrene and copolymers. More particularly, this invention pertains to such ultrasonic laminating which is effected on-the-fly: that is, while the webs are being forwarded in juxtaposed relation at a relatively high velocity.

BACKGROUND ART

Prior ultrasonic bonding apparatuses include apparatuses for coverting web or sheet materials into laminates on-the-fly with predetermined patterns of bonded regions. Such apparatuses are disclosed, for example, in U.S. Pat. No. 3,562,041—Robertson; and U.S. Pat. No. 3,733,238—Long et al.

Robertson discloses that the working tip preferably be straight [i.e., flat] or tapered in the downstream direction for smooth entry and passage of the objects but, concomitantly, that there be a minimum area of contact between the working tip and the anvil or back-up. With respect to such apparatus having an anvil cylinder, the patent teaches that the tip have either a tangent relation to the anvil, or be tapered in the direction of rotation to provide greater convergence where desired than a tangent relation. This patent also discloses intermittently forming a wider gap between the working tip and the anvil to facilitate the entry and passage of materials between them.

U.S. Pat. No. 3,733,238—Long et al provides plural ultrasonic horns which are shown in the figures to have flat faces, and which horns are offset in the machine direction.

While the background art discloses methods and apparatus which have been developed to overcome some of the problems of ultrasonically bonding webs to convert them into laminates—particularly pattern bonded laminates—the discovered background art has not solved all of the problems associated with such web laminating in the manner of nor to the extent of the present invention. In particular, but not intending to thereby limit the scope of the present invention, providing a machine-direction elongate ultrasonic bonding passageway in which the webs are progressively subjected to increasing compressive forces over a substantial distance in the machine direction as they traverse the bonding passageway and which bonding passageway preferably has a sufficiently high upstream opening to obviate websplice-induced jams.

DISCLOSURE OF THE INVENTION

In accordance with one aspect of the invention, a method is provided for dynamically ultrasonically bonding a plurality of webs together while they are being forwarded in juxtaposed relation along a predetermined path at a predetermined velocity, and which webs are subject to being ultrasonically bonded into a laminate having bonded regions. The method comprises the step of subjecting the portions of the webs which are to be bonded to progressively increasing compressive forces along an elongate portion of the path, which compressive forces are derived from biasing an ultrasonic powered ultrasonic horn towards a driven anvil. In a preferred embodiment the elongate portion of the web path has a machine-direction length of about fifty or more times the sum of the uncompressed thicknesses of the webs; and more preferably about one-hundred times or more. The method may also include the step of subjecting the bonded regions of the laminate to post-bonding compression before the bonds become fully set upon cooling. Apparatus embodiments of the invention may provide a bonding passageway which is arcuate-shape and converges in the downstream direction over a concomitantly elongate, circumferentially extending portion of a cylindrical, powered anvil, the convergence being from an entrance height which is greater than the total uncompressed thicknesses of the webs to a virtually contacting relation; and may further include a divergent portion downstream from the convergent portion. Preferably, the entrance height is from about one to about four times the sum of the web thicknesses, and more preferably, from about one to about two times such sum. The horn face may be of a uniform radius greater than the radius of the anvil cylinder and disposed to provide the passageway with a longer convergent portion than divergent portion. The apparatus may further include a relatively non-deformable, rotatably mounted pressure roll which is biased towards the anvil adjacent the downstream end of the bonding passageway.

BRIEF DESCRIPTIONS OF THE DRAWINGS

While the specification concludes with claims particularly pointing out and distinctly claiming the subject matter regarded as forming the present invention, it is believed the invention will be better understood from the following description taken in conjunction with the accompanying drawings in which:

FIG. 2 is an enlarged scale, fragmentary plan view of elements of a representative, relief type bonding pattern disposed on the cylindrical surface of the anvil cylinder of the apparatus shown in FIG. 1.

FIG. 3 is an even more greatly enlarged scale, fragmentary view of a portion of the relief-type bonding pattern shown in FIG. 2.

FIG. 4 is an enlarged side elevational view of the ultrasonic horn and anvil cylinder of the apparatus shown in FIG. 1, but in which FIG. 4 the elements are non-uniformly scaled for the purpose of visibly showing tandemly disposed convergent and divergent portions of the bonding passageway disposed between the horn-face and the anvil cylinder.

FIG. 5 is a sectional view of the ultrasonic horn shown in FIG. 4 and taken along line 5—5 thereof for the purpose of showing that the horn-face has a rectilinear planform.

DETAILED DESCRIPTION OF THE INVENTION

Figure 1:
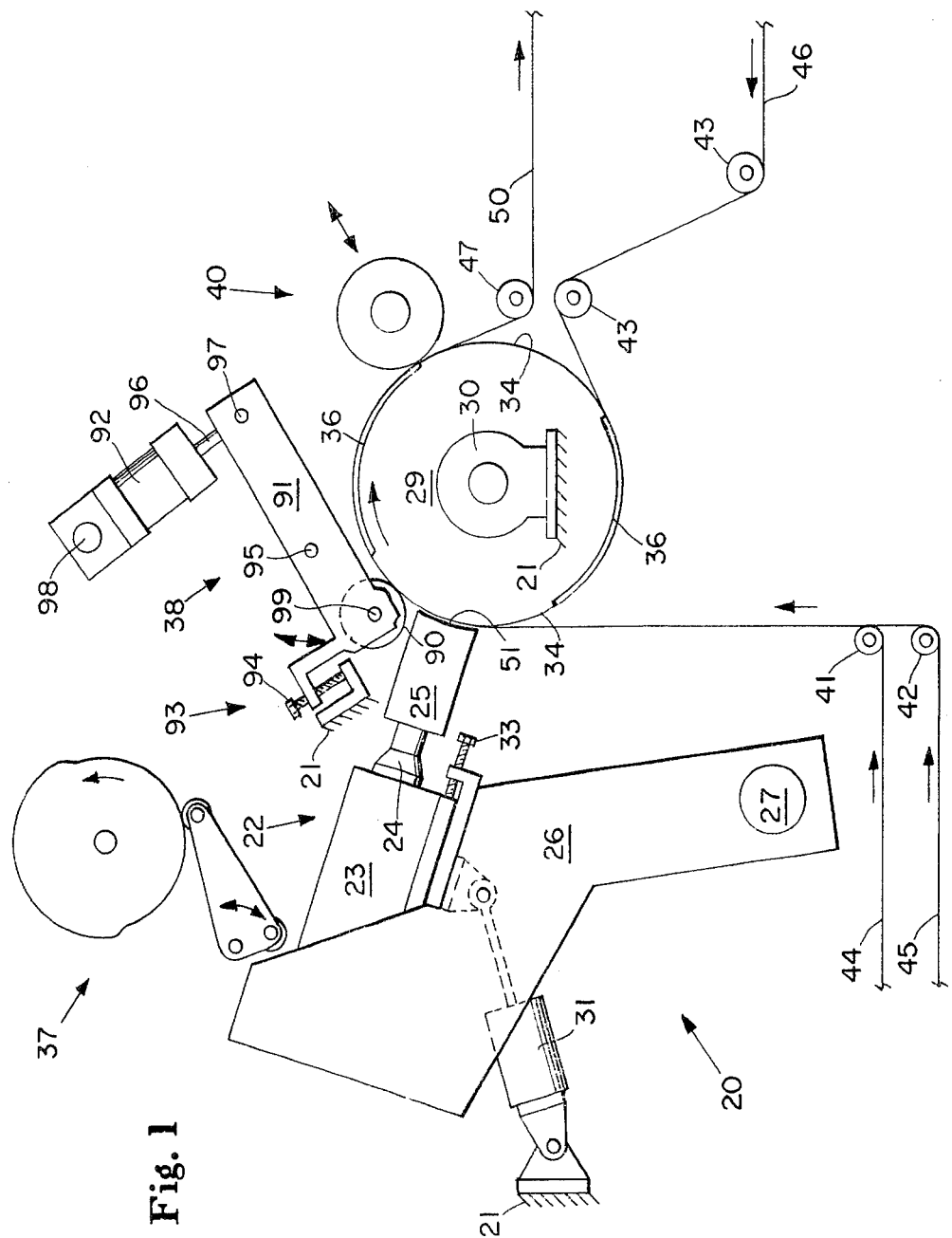
FIG. 1 is a partially schematic, fragmentary side elevational view of an exemplary apparatus embodiment of the present invention.

An exemplary web laminating apparatus 20 embodying the present invention is shown in FIG. 1 to include a frame 21 (only part of which is shown); an ultrasonic power device 22 comprising an ultrasonic transducer 23, amplifier 24, and ultrasonic horn 25; a pivotally mounted frame assembly 26 pivoted on bearing 27 and upon which the ultrasonic power device 22 is adjustably mounted; a rotatably mounted anvil cylinder 29 having relief-type patterned areas 34, and non-bond inducing areas 36; anvil drive means 30; actuator means 31 for biasing the ultrasonic horn 25 towards the anvil cylinder 29; contact-point adjustment means 33, camming means 37 for spacing the ultrasonic horn 25 outwardly from the anvil cylinder 29 while the non-bond-patterned areas 36 of the anvil cylinder 29 pass the ultrasonic horn 25; post-bonding compression means 38; tension isolating means 40; guide rolls 41, 42 and 43 for guiding three webs 44, 45 and 46, respectively, onto the anvil cylinder 29; and guide roll 47 for guiding the laminated web 50 to downstream ancillary apparatus such as, for instance, reeling means not shown. The apparatus may further include means for forwarding the webs under controlled tension, which means are well known to persons of ordinary skill in the art, and which means are not shown for the purpose of enhancing the clarity of FIG. 1.

Briefly, when the exemplary apparatus 20, FIG. 1, is operated, webs 44, 45 and 46 which are subject to being ultrasonically bonded together are forwarded onto the power-rotated anvil cylinder 29 having a circumferential velocity which is preferably from about seventy to about four-hundred meters per minute; pass through a pressure biased, ultrasonic bonding passageway between the ultrasonic horn 25 and the anvil cylinder 29 where they are subjected to ultrasonic vibrational energy whereupon predetermined patterned regions of the webs become bonded regions in laminate 50; the bonded regions of laminate 50 are subjected to post-bonding compression by means 38 to enhance the bonds; and the portion of laminate 50 disposed on anvil cylinder 29 is isolated from downstream tension by means 40.

As is more fully described hereinafter, the horn-face 51 of ultrasonic horn 25 has a curvilinear-shape which is so configured and disposed with respect to bond-pattern defining elements disposed on the surface of anvil cylinder 29 that an arcuate-shape bonding passageway is defined therebetween to have a convergent entrance portion in tandem relation with a divergent exit portion. The curvature of the horn-face 51 is so related to the radius of the anvil cylinder 29 that the passageway has a substantial machine-direction-elongate active length over which active length the webs will be acted on compressively by the inwardly biased ultrasonic horn; and the ultrasonic horn is so disposed that the convergent portion preferably has a somewhat greater machine-direction length than the divergent portion of the passageway. By making the height of the entrance to the passageway from one to four times the sum of the uncompressed thicknesses of the webs, and the active length of the passageway preferably about fifty or more times and, more preferably, one-hundred or more times the sum of the uncompressed thicknesses of the webs, bonding will occur over substantial lengths of machine-direction web travel. Also, while not intending to be bound by a theory of operation, it is believed that such a bonding passageway having such a machine-direction-elongate active length enables the ultrasonic horn to function as a vice at ultrasonic frequency to cyclically stop the upper surface of the outermost web 44 while the driven anvil continues to advance the inner surface of the innermost web 46. This induces shear strains in the webs at the ultrasonic frequency of the ultrasonic horn 25. Thus, the total bonding energy is derived from the sum of the ultrasonic compressive-strain hysteritic losses induced by the ultrasonic horn per se, and the ultrasonic shear-strain hysteritic losses induced by the horn clamping and anvil rotation. It is further believed that by thus supplying hysteritic loss energy from the anvil cylinder drive means enables the use of a lower power ultrasonic transducer than would otherwise be required; and, at least for some applications, makes the bonding quality of the apparatus relatively insensitive to anvil velocity over a substantial velocity range.

FIG. 2 is a fragmentary plan view of a relief-type patterned area 34 of anvil cylinder 29, FIG. 1. Pattern elements 53 are elongate in the machine-direction and have wide regions 54 spaced apart in the machine direction by narrow connecting runners. Pattern elements 55 are spaced in the machine direction and have discshape faces. Pattern elements 53 and 55 extend radially outwardly from the remainder of the surface 56 of the patterned portion 34 of anvil cylinder 29; and may be made integrally with anvil cylinder 29 or discretely made and then secured to surface 56.

FIG. 3 is a fragmentary enlarged scale view showing the smoothly curved shape of a wide region 54 of an elongate pattern element 53.

FIG. 4 (not a scale view) shows the side-elevational spatial relationship of the ultrasonic horn 25 and the anvil cylinder 29 of the exemplary apparatus 20, FIG. 1, in a spaced apart relation as though webs (not shown) were in fact present. In FIG. 4, the ultrasonic horn 25 has a machine-direction length designated MDL, and the horn-face 51 has a radius designated RH which is drawn coincident with the imaginary axial centerline of the ultrasonic horn 25; the anvil cylinder 29 has a radius designated RA which, as drawn, is parallel to RH; and the ultrasonic horn 25 is so asymmetrically disposed with respect to anvil cylinder 29 that their closest points (i.e., the points which would be in contacting relation were webs not present) are aligned with the common radius designated RC. Thus, the common radius RC is angularly offset from the radius RA by the angle designed B; and the axial centerline of the ultrasonic horn 25 is spaced forwardly (i.e., in the upstream direction) of the axis of rotation of the anvil cylinder 29 by a distance designated OS. Thus, an arcuate-shape bonding passageway designated 58 is defined intermediate the horn-face 51 and the adjacent surface portion of the anvil cylinder. As drawn, not to scale, passageway has a visibly convergent entrance portion designated 59, and a visibly divergent exit portion designated 60 albeit, were preferred embodiments drawn to scale, such convergence and divergence would not generally be visibly noticeable. However, such convergence and divergence are desirable—indeed the convergence is essential—and the asymmetrical offset enables the cantilevered tip of the ultrasonic horn 25 to be somewhat displaced circumferentially of the anvil cylinder by drag forces without precipitating serious deliterious consequences. That is, when drag forces so displace the horn tip, the point of closest approach of the horn-face to the anvil surface effectively rolls upstream (i.e., changing offset OS and angle B, FIG. 4) without having a substantial effect on either the geometry of the active length portion of the passageway 58 or its entrance height EH. For example, in a preferred embodiment, a change in OS of about one millimeter changes the entrance height EH by less than about one-fortieth of a millimeter.

FIG. 5 is a reduced scale sectional view taken along line 5—5 of FIG. 4 for the purpose of showing the solid construction of ultrasonic horn 25, and the rectilinear shape of the planform of its horn-face. The cross-machine-direction width of the ultrasonic horn 25 is designated MDW.

Figure 6:
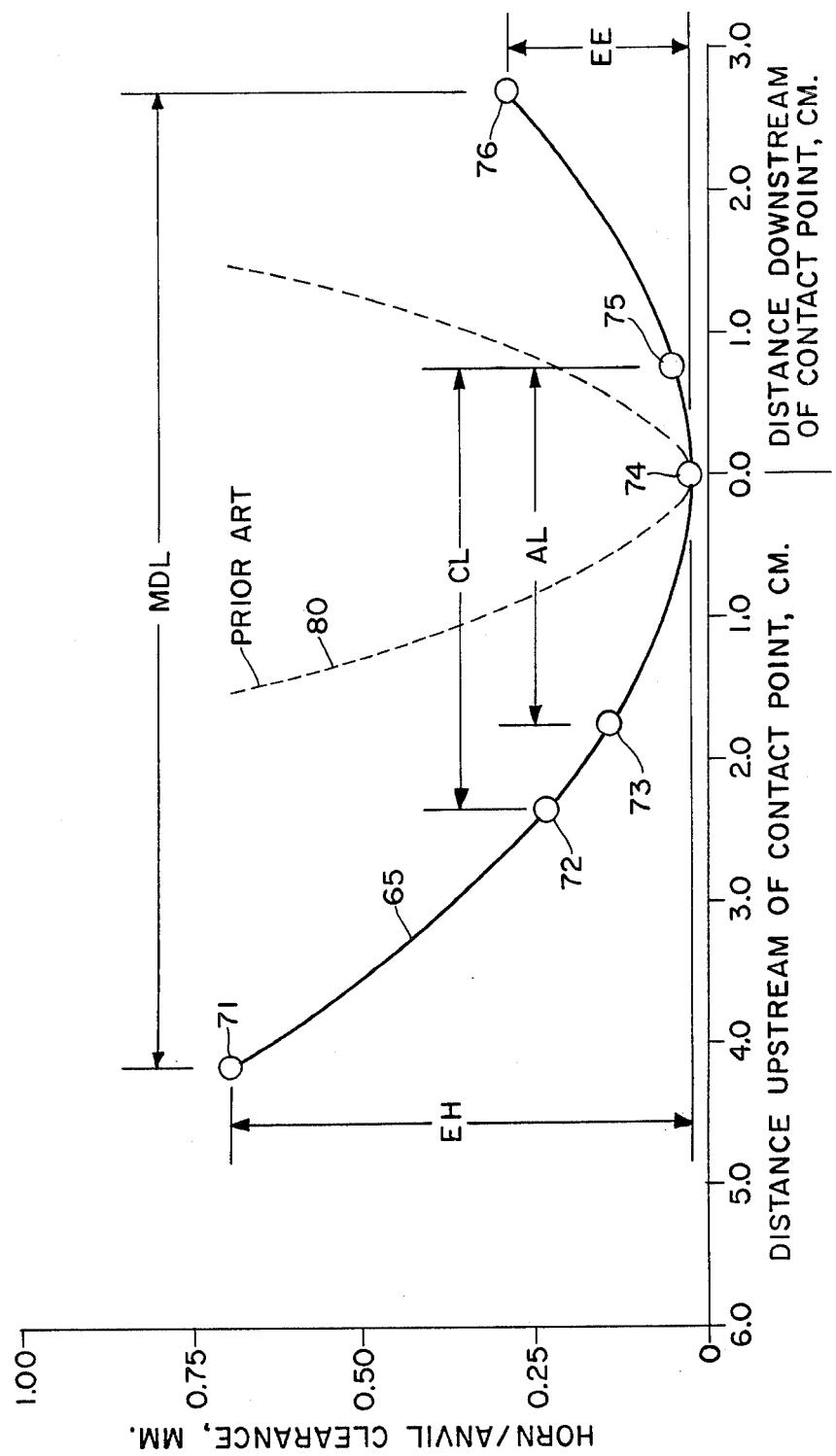
FIG. 6 is a graph showing the clearance relation between an exemplary horn-face and an exemplary anvil cylinder such as shown in FIG. 4; and, by way of comparison, the corresponding clearance between a flat-faced horn and the same anvil cylinder.

FIG. 6 is a graph on which line 65 represents the clearance between an exemplary ultrasonic horn 25 and anvil cylinder 29 for practicing the present invention to ultrasonically bond an elasticized trilaminate 50 consisting of a nonwoven polyester top web 44 having a nominal thickness of about eighteen-hundredths of a millimeter an elastomeric butadient/styrene copolymer second or middle web 45 having a nominal thickness of about four-hundredths of a millimeter and elongated about one-hundred percent; and a polyethylene third or bottom web 46 having a nominal thickness of about three-hundredths of a millimeter. For this trilaminate application of the present invention, the ultrasonic horn 25 had a MDL, FIG. 5, of about seven centimeters, a MDW, FIG. 5, of about five centimeters; a horn-face 51 having a radius RH, FIG. 4, of about seventeen centimeters; was made of titanium; and was powered with a Branson Model 186P fourteen-hundred-watt power supply driving an ultrasonic transducer 23 (Branson converter Model 802), and fitted with a two-and-one-half to one amplifier 24 (Branson booster for a Model 401 actuator). Concomitantly, anvil cylinder 29 had a radius RA, FIG. 4, of about fifteen-and-one-quarter centimeters and a relief pattern of the general configuration shown in FIGS. 2 and 3. The pattern elements 53 and 55 had radially extending heights of about one-half millimeter. The ultrasonic horn 25 was disposed with respect to the anvil cylinder as generally shown in FIG. 4 with an offset OS of about three millimeters and an offset angle B of about three degrees which offsets were set through the use of the contact-point adjustment means 33, FIG. 1. The clearance between the horn-face 51 and the anvil cylinder 29 was then calculated along the circumferential length of the passageway 58, FIG. 4, and plotted to generate line 65. The points designated 71 through 76 are, respectively: point 71 is the entrance to passageway 58, FIG. 4, having a net (without webs being present) entrance height EH or clearance of about seven-tenths of a millimeter; point 72 which is the point of initial contact of the three juxtaposed webs with the horn-face; point 73 at which point the webs have become sufficiently manually compressed to effectively commence being heated by the vibratory energy supplied by the ultrasonic horn; point 74 which is the point of closest approach of the horn-face to the anvil cylinder (i.e., to the pattern elements on the anvil cylinder) and is indicated to have a clearance of about twenty-five microns (one-thousandth of an inch); point 75 which is the point at which the trilaminate 50, FIG. 4, loses contact with the horn-face 51 and which is indicated to have a clearance of about fifty microns (two-thousandths of an inch); and point 76 is the exit of passageway 58, FIG. 4, having an indicated net height EE (i.e., without webs) of about three-tenths of a millimeter. Thus, as the above indentified webs 44, 45 and 46 pass between the horn-face 51 and the anvil cylinder 29, FIG. 1, they are in contact with the horn-face from point 72 to point 75 which is a machine-direction distance (contact length CL) of about three centimeters; they are mechanically compressed as they travel from point 72 to point 73; progressively compressed and ultrasonically heated as they travel from point 73 to 74; experience diminishing ultrasonic heating and diminishing compression as they travel from point 74 to point 75 whereat contact with the horn-face is lost. Thus, in this configuration, the contact length CL of the passageway is about three centimeters, and the ultrasonically active length AL is about two-and-one-half centimeters. Such an apparatus has been found to be very effective for bonding such a trilaminate at speeds in the range of from about ninety meters per minute to about two-hundred-fifty meters per minute although it is not intended to thereby imply a limitation of the present invention. Also, however, in this speed range the bonding of the exemplary trilaminate was found to not be very sensitive to speed changes. That is, over this speed range, bonds of relatively uniform strength were obtained by only adjusting the horn bias a relatively small amount. By way of comparison with line 65, line 80 is the clearance between a prior-art flat faced ultrasonic horn and the same anvil cylinder discussed. As shown in FIG. 6, such a flat-face/anvil configuration has a much steeper convergence and divergence, and a much shorter machine-direction active length. Such steeper convergence is more apt to precipitate web tearing at high machine speeds; and the shorter active length further limits the effective speed at which the apparatus can operate.

Referring again to FIG. 1, camming means 37 are provided to mechanically space the horn-face 51 from the anvil cylinder while unpatterned areas such as areas 36 of the anvil cylinder 29 pass under the horn-face to obviate damage to the apparatus. Thus, the need for such camming means would be obviated if the anvil cylinder has a continuous bonding pattern disposed on its cylindrical periphery; and the need for such camming means would be substantially vitiated if alternate means (not shown) were provided for interrupting the ultrasonic power and/or the horn bias as unpatterned portions of the anvil cylinder pass the ultrasonic horn. In this event, the entrance height EH of the bonding passageway should be sufficient to cause the horn-face to ride up and over and threshhold end portions of the pattern elements to obviate damaging the ultrasonic horn and the pattern elements.

Still referring to FIG. 1, the laminate 50 emerging from between horn-face 51 and anvil cylinder 29 is subjected to post-bonding compression by means 38.

Post-bonding compression means 38, FIG. 1, comprises a pressure roll 90, a lever arm 91, an actuator 92, and an adjustable innermost-travel-stop means 93 comprising an adjustment bolt 94. The lever arm 91 is rotatably mounted on pivot pin 95, the rod 96 of actuator 92 is pinned to the lever arm by pivot pin 97; the base of the actuator 92 is pivotally connected to the frame of the apparatus by pivot pin 98, and the pressure roll 90 is rotatably secured to the lever arm 91 on shaft 99. In operation, the actuator 92 is powered to bias the pressure roll 90 towards the anvil cylinder with a predetermined but adjustable force; and the adjustment bolt 94 is adjusted to provide a touching but not pressure loaded contact between the pressure roll 90 and the anvil cylinder in the absence of a laminate 50. Thus, a laminate will be subjected to the full predetermined force, and the predetermined force will be distributed on the bonded regions of the laminate.

In the exemplary embodiment of apparatus 20 described hereinabove, a steel pressure roll having a diameter of about seven-and-one-half centimeters was provided and was biased with a force of up to about forty kilograms per lineal centimeter of machine width (i.e., the length of the pressure roll). By virtue of being steel, this pressure roll was substantially non-deformable when biased. Thus, the biasing force—the post-bonding compression force—was limited to the bonded regions of the laminate disposed between the pattern elements on the anvil cylinder and the pressure roll. This effectively increased the peel strength of the trilaminate described above. Again, while not intending to be bound by a theory of operation, it is believed that such a post-bonding compression is especially effective for laminates comprising a non-woven web because it causes the fibers thereof to be virtually imbedded in the next adjacent web (i.e., the elastomeric web in the exemplary trilaminate described hereinabove).

The post-bonding compression described above enables the apparatus operator some latitude in setting the biasing force for the ultrasonic horn (i.e., actuator 31) and the biasing force for the pressure roll (i.e., actuator 92) to precipitate bonds having satisfactory peel strengths. That is, generally speaking, horn biasing may be lowered if pressure roll bias is increased. Inasmuch as high horn bias can precipitate perforations, and high rates of horn wear, or other undesirable effects, the pressure roll bias enables the apparatus operator to maintain a non-deleterious low level of horn bias and still achieve satisfactory bonds by applying sufficient post-bonding compression.

Tension isolating means 40, FIG. 1, are provided for the purpose of isolating the portion of laminate 50 disposed upstream therefrom from the level of tension applied to the laminate 50 downstream from means 40. In some applications, such means are optional: that is, such means are optional where the level of downstream tension is insufficient to otherwise precipitate deliterious consequences with respect to issuing a satisfactorially bonded laminate 50 from the apparatus.

While particular embodiments of the present invention have been illustrated and described, it would be obvious to those skilled in the art that various other changes and modifications can be made without departing from the spirit and scope of the invention. Moreover, while the invention has been illucidated by describing an exemplary trilaminate, it is not intended to thereby preclude bilaminates and laminates of greater than three plies from the scope of the invention. Therefore, it is intended to cover in the appended claims all such changes and modifications that are within the scope of this invention.

What is claimed is:

1. A method of dynamically ultrasonically bonding together a plurality of webs while they are being forwarded in juxtaposed relation along a predetermined path at a predetermined velocity, and which webs are subject to being ultrasonically bonded into a laminate having bonded regions, said method comprising the steps of: subjecting the portions of said webs to be bonded to progressively increasing compressive forces along an elongate portion of said predetermined path, said compressive forces being derived from biasing an ultrasonically powered ultrasonic horn towards a driven anvil; applying sufficient ultrasonic power and biasing to said ultrasonic horn to effect said bonding; forwarding said laminate from under the action of said horn-biasing induced compressive force; and then subjecting only said bonded regions of said laminate to a substantial post-bonding compression prior to the bonded regions becoming fully set.

2. A method of dynamically ultrasonically bonding together a plurality of webs while they are being forwarded in juxtaposed relation along a predetermined path at a predetermined velocity, and which webs are subject to being ultrasonically bonded into a laminate having bonded regions, said web comprising one web and a second web, said second web comprising an elastomeric film, said method comprising the steps of: subjecting the portions of said webs to be bonded to progressively increasing compressive forces along an elongate portion of said predetermined path, said compressive forces being derived from biasing an ultrasonically powered ultrasonic horn towards a driven anvil; applying sufficient ultrasonic power and biasing to said ultrasonic horn to effect said bonding; and elongating said second web in the machine direction up to about one-hundred-fifty percent prior to said bonding and constraining said second web to remain so elongated during said bonding.

3. The method of claim 2 further comprising the steps of forwarding said laminate from under the action of said horn-biasing induced compressive force, and then subjected the bonded regions of said laminate to a substantial post-bonding compression prior to the bonded regions becoming fully set.

4. A method of dynamically ultrasonically bonding together a plurality of webs while they are being forwarded in juxtaposed relation along a predetermined path at a predetermined velocity, and which webs are subject to being ultrasonically bonded into a laminate having bonded regions, said webs comprising one web comprising an interfilamentary bonded fibrous material, a second web comprising an elastomeric film, and a third web comprising a polyethylene film, said second web being disposed intermediate said one web and said third web, the total uncompressed thicknesses of said webs being about one-quarter millimeter or less, and said predetermined velocity being from about seventy meters per minute to about four-hundred meters per minute, said method comprising the steps of: subjecting the portions of said webs to be bonded progressively increasing compressive forces along an elongate portion of said predetermined path, said compressive forces being derived from biasing an ultrasonically powered ultrasonic horn towards a driven anvil; and applying sufficient ultrasonic power and biasing to said ultrasonic horn to effect said bonding.

5. The method of claim 4 further comprising the steps of forwarding said laminate from under the action of said horn-biasing induced compressive force, and then subjecting the bonded regions of said laminate to a substantial post-bonding compression prior to the bonded regions becoming fully set.

6. The method of claim 4 or 5 wherein said one web comprising fibrous material is disposed intermediate said ultrasonic horn and said second web during said bonding.

* * * * *